United States Patent [19]
Ledwell, Jr.

[11] 3,921,588
[45] Nov. 25, 1975

[54] METHOD AND APPARATUS FOR HARVESTING DOMESTIC FOWL

[76] Inventor: Lloy W. Ledwell, Jr., P.O. Box 1106, Texarkana, Tex. 75501

[22] Filed: July 26, 1974

[21] Appl. No.: 492,348

[52] U.S. Cl. ............................................. 119/82
[51] Int. Cl.² ........................................ A01K 29/00
[58] Field of Search ............................. 119/82, 12

[56] References Cited
UNITED STATES PATENTS

| | | | |
|---|---|---|---|
| 3,173,564 | 3/1965 | Mayo | 119/12 X |
| 3,672,335 | 6/1972 | Sanders | 119/82 |
| 3,785,349 | 1/1974 | Christopher | 119/82 |
| 3,805,744 | 4/1974 | Jochum | 119/82 |

*Primary Examiner*—Hugh R. Chamblee
*Attorney, Agent, or Firm*—Laney, Dougherty, Hessin & Fish

[57] ABSTRACT

A method for harvesting invention fowl which includes the steps of horizontally extending beneath the fowl, in a confined area, a plurality of lifting fingers; raising and pivoting the fingers to lift the fowl and supporting them at least in part upon a continuously moving structure; continuing to said the fowl on the continuously moving structure to convey the fowl to a cooping location; and moving the fowl into a coop from the continuously moving structure. fingers The apparatus of the ivention includes a plurality of sets of fingers forming spaced rows of fingers; means for moving the fingers through an endless path having a lowermost portion; means for guiding and supporting the fingers during movement through said path and for positioning each row of sid fingers in a generally horizontally extending position during traversal of the lowermost portion of the path; means cooperating with the fingers to form a conveyor; a framework supporting the conveyor, the finger moving means, and the finger guiding and supporting means to position the ends of the fingers in each row adjacent the ground when the fiingers traverse the lowermost portion of the endless path; and a mobile structure having the framework mounted thereon to facilitate transport of the apparatus from one location to another.

20 Claims, 11 Drawing Figures

METHOD AND APPARATUS FOR HARVESTING DOMESTIC FOWL

BACKGROUND OF THE INVENTION

1. Field of the Invention

This invention relates to methods and apparatus for picking up or collecting chickens or other domestic fowl from a confined location at ground level, such as a broiler house, and conveying such fowl to coops.

2. Brief Description of the Prior Art

In the poultry industry, it is frequently desirable or necessary to transport chickens in large quantities from one location to a different location some distance away. The chickens thus transported may vary in size, and the purposes of the transport may vary. An example, however, of a frequently occurring situation of the type described is where it is desired to transport young chickens of broiler size from a broiler house to a facility owned by a purchaser of the chickens.

For the purpose of harvesting and transporting chickens under the described circumstances, it was, until recently, the prevailing practice to harvest the chickens manually, employing a number of workers who would enter the broiler houses, preferably at night when the chickens were relatively inactive, and work during the night to catch the chickens and load them into coops for subsequent loading on transport vehicles. This manner of harvesting large numbers of chickens was expensive due to the labor costs, and also was subject to limitations in the number of chickens which could be effectively gathered and cooped within a given period of time. Further, the dust, feathers and commotion which were frequently all created in large amounts in the course of such harvesting and cooping rendered working conditions less than wholesome for the harvest hands, and the chickens themselves generally did not undergo the experience entirely without trauma or, in some instances, actual injury or physical impairment.

More recently, machines have been developed for harvesting and cooping chickens which operate by developing and applying in a local pick-up zone, a relatively intense vacuum or suction. The chickens are thus sucked up into an elongated duct or tubing and conveyed by vacuum to a point of discharge where they can be placed in coops. This technique expedites the gathering of the chickens, but experiences some disadvantages after the chickens have become disturbed and have tended to move into corners or to higher levels or to locations not readily accessible to the vacuum pick up head. Moreover, some injury or physical impairment generally results to some of the chickens handled in this manner as a result of bumping and forceable impact with turns or angles in the duct work through which they are passed to the cooping location. The chickens also do not respond impassively to this handling, and it is believed that the laying habits of some hens may be at least temporarily disturbed or deranged by this method of harvesting.

BRIEF DESCRIPTION OF THE PRESENT INVENTION

The present invention provides an improved, highly effective apparatus for gently harvesting in a very rapid, high volume fashion, chickens and other domestic fowl where such fowl are located in a confined space at ground level, such as within a broiler house having relatively broad bays therein. The apparatus, though believed to be of novel structure, is also based upon certain operating principles, and the use of certain processing steps, which are in themselves thought to be unique, and the present application is therefore directed to both a method and apparatus of harvesting chickens.

Broadly described, the apparatus of the invention, at its most important and novel point, comprises a plurality of moving fingers which are arranged in sets, with each of the sets of fingers comprising a row which forms a fence. Means are provided for moving these fingers through a particular path and in cooperation with other structure which, with the fingers, forms a conveyor. The path through which the fingers are moved is geometrically configured and located such that the path has a lowermost portion which extends in close proximity, and substantially parallel, to the ground at such time as the apparatus is operated for harvesting chickens. As the fingers are moved through this portion of their path of travel, they are inclined downwardly very slightly with respect to the horizontal so as to form with the rest of the harvesting apparatus, a barrier preventing chickens from escaping from the advancing apparatus by running beneath or under the apparatus.

From this location, the fingers are advanced until they project substantially horizontally ahead of the apparatus and still in close proximity to the ground. They then commence the traverse of a portion of their path of travel which causes the fingers to pivot into an upstanding fencing position, and to rise and move rearwardly with respect to the apparatus. By means of this apparatus, the fingers can be moved gently under chickens standing or squatting upon the ground, followed immediately by the gentle lifting and upturning of the fingers to lift the chickens and support them partially on the fingers and partially on a cooperating supporting structure which forms with the fingers, the described conveyor.

I have determined that chickens characteristically will not fly or attempt to jump from a gently moving structure, but will instead attempt to stand in the same location and retain their balance on the moving structure. This determination allows us to convey the chickens in a continuous and evenly moving fashion by means of the described conveyor and one or more additional conveyors, if needed, to a location where coops for receiving the chickens are located. Here the chickens may be discharged into the coops or, if desired, hand removed from the moving conveyor and placed in the coops.

The process or method which underlies the structure of the apparatus described, and is employed in the harvesting of the chickens, includes the steps of first horizontally extending beneath the chickens, a plurality of lifting fingers. The fingers are then raised and pivoted to lift the fowl and to support them at least in part upon a continuously moving structure. The conveyance of the fowl is continued during the continuous movement of this structure so as to convey the fowl to a cooping location. At this location, the fowl are moved into a coop from the continuously moving structure.

From the foregoing broad description of the invention, it will be perceived that an important object of the invention is to provide an apparatus which can be effectively used for harvesting chickens from the ground or broiler house floor by automatic means in such a way that the chickens may be moved to a convenient cooping location.

A further object of the invention is to provide a machine for harvesting chickens in a way which is gentle and does not harm or injure the chickens in the course of gathering up the chickens and conveying then into coops.

A further object of the invention is to provide an apparatus for gathering, picking up and conveying chickens in a rapid and efficient manner.

Another object of the invention is to provide an apparatus for harvesting chickens without excessively disturbing the chickens and without creating airborne dust and feathers in any significant quantities.

Additional objects and advantages of the invention will become apparent as the following detailed description of certain preferred embodiments of the invention is read in conjunction with the accompanying drawings which illustrate the invention.

BRIEF DESCRIPTION OF THE DRAWINGS

FIG. 6 is a vertical sectional view taken just forward of a conveyor support frame forming a part of the apparatus.

FIG. 7 is a detail view illustrating, in elevation, certain structure employed in the forward conveyor assembly forming a part of the fowl harvesting apparatus.

FIG. 8 is a side elevation view of the forward conveyor assembly as it appears on the opposite side thereof from that shown in FIG. 3.

FIG. 9 is a detail view illustrating a portion of the forward conveyor at a location near the upper end thereof, and showing in dashed lines, several alternate positions of the pick-up fingers.

FIG. 10 is a view similar to FIG. 9, but showing the cross conveyor utilized in conjunction with the forward conveyor.

FIG. 11 is a vertical sectional view through a fowl discharge hopper forming a part of fowl harvesting apparatus of the invention.

DETAILED DESCRIPTION OF A PREFERRED EMBODIMENT OF THE INVENTION

Figure 1:
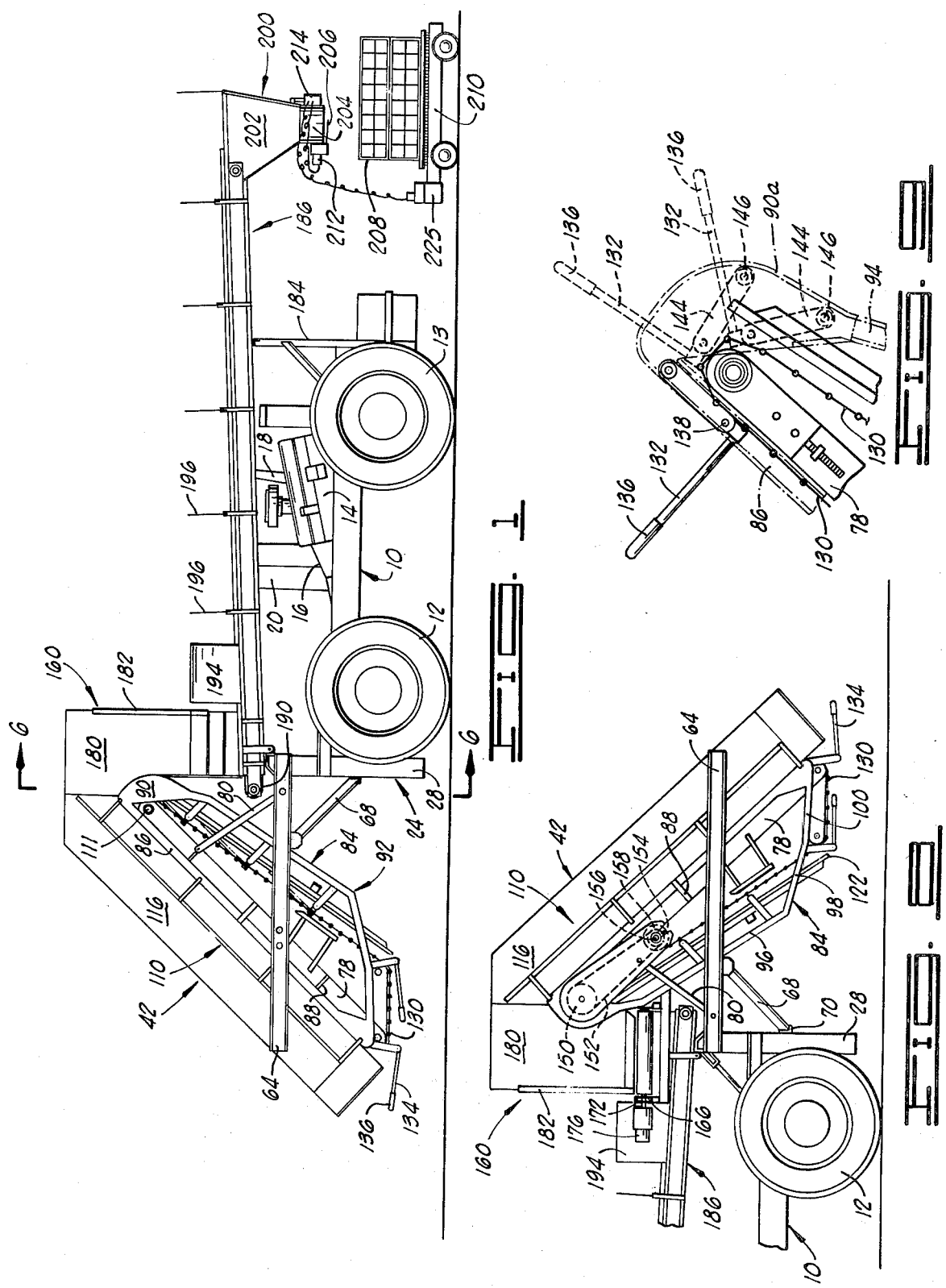
FIG. 1 is a side elevation view of the fowl harvesting apparatus of the invention illustrating a forward conveyor used for picking up and moving the fowl upwardly and rearwardly, as such forward conveyor appears in its elevated, over-the-road transport position.

Referring to FIG. 1 of the drawings, the fowl harvesting apparatus of the present invention includes a chassis 10 supported on ground engaging wheels, including forward wheels 12 and rear wheels 13. Carried on the chassis 10 is a suitable prime mover, such as a gasoline engine 14, which drives the ground engaging wheels 12 through a suitable transmission 16. An operator's seat 18 is mounted on the chassis 10 and provides access to suitable hydraulic control levers 20 used for controlling the forward conveyor assembly, hereinafter described, and for controlling the mobility and steering of the apparatus.

At its forward end, the chassis 10 has rigidly secured thereto, an upwardly extending forward conveyor support frame 24. The conveyor support frame 24 includes parallel, vertically extending rigid channel members 28 which are interconnected at their lower ends by a transverse channel member 30. At their upper ends, the channel members 28 are interconnected by a pair of transversely extending angle iron members 32.

A forward conveyor assembly 42 includes a movable supporting framework, designated generally by reference numeral 46. The movable supporting framework 46 is supported for vertical movement on the conveyor support frame 24 by means of a pair of large, vertically extending piston and cylinder assemblies 48 and 50. Each of these assemblies 48 and 50 includes a cylinder 52 having its base resting on a web of the channel member 30, and an extensible piston rod 54 having its free, external end bearing against the web portion of a transverse channel member 56. The channel member 56 forms a part of the forward conveyor assembly supporting framework 46 and extends between and interconnects a pair of vertically extending frame members 58 forming the sides of the framework 46. The vertically extending frame members 58 each have secured thereto by appropriate axles and journals, a pair of guide rollers 60 which roll in the support frame channel members 28 as the framework 46 is reciprocated vertically relative to the frame 24. As will be hereinafter explained, the described relative movement between the framework 46 and the support frame 24 is effected in order to elevate the forward conveyor assembly 42 to a position above ground level as shown in FIG. 1 to facilitate the over-the-road transport of the entire fowl harvesting apparatus of the invention when it is not in use for harvesting chickens or other domestic fowl.

The forward conveyor assembly 42 further includes, in addition to the movable supporting framework 46, a pair of substantially parallel, elongated beams 64 which project horizontally and have two opposed ends thereof interconnected by means of a transversely extending beam 66. The transversely extending beam 66, which is C-shaped or a channel in cross section, is mounted on exposed faces of the vertically extending frame members 58 of the movable supporting framework 46 and undergoes vertical reciprocation with the movable supporting framework 46. A pair of diagonal braces 68 extend downwardly and inwardly from points of connection to a medial portion of each elongated beam 64, and have their rearward and lowermost ends connected to transversely extending channels 70 which are joined to the vertically extending frame members 58 of the movable supporting framework 46.

Each of the elongated beams 64 is connected by bolts or other suitable means to an inclined conveyor support frame member 78. The two conveyor support frame members 78 are horizontally spaced, and are interconnected by a plurality of rigid transverse bars (not shown) to form a generally rectangular supporting framework. Further support for this framework on the elongated I-beam members 64 is provided by a pair of horizontally spaced brace members 80 disposed on opposite sides of the harvesting apparatus and each having an upper end connected to the respective inclined conveyor support frame member 78, and a lower end connected to one of the beams 64.

Mounted on each of the inclined conveyor support frame members 78 on opposite sides of the forward conveyor assembly 42 are a pair of conveyor guide rail subassemblies 84. One of such subassemblies 84 is illustrated in detail in FIG. 3 of the drawings. Each of the conveyor guide rail subassemblies 84 includes an elongated channel 86 of C-shaped cross-section which is only slightly shorter in length than the respective inclined conveyor support frame member 78, and which is secured over the latter member with the open side of the channel facing across the forward conveyor assembly 42. A plurality of triangular gusset plates 88 are used for securing each elongated channel 86 to its respective conveyor support frame member 78 in the position described.

At its upper end, each elongated channel 86 is secured by welding or other suitable means to a half-moon shaped guide pan 90 which includes a roller guide flange 90a of arcuate configuration projecting normal to a guard plate 90b. A lower run track 92 forms the lowermost portion of each conveyor guide rail subassembly 84 with such track being formed of sections of channels joined in the illustrated configuration. Thus, each lower run track 92 includes a short channel section 94 which projects downwardly and slightly forwardly from the guide pan 90, and is connected at its lower end to one end of a relatively long channel section 96 which has its other end connected through a channel section 98 to the forwardmost channel section 100 in the lower run track 92. The channel section 100 has its forward end connected through a radiused bend 100a to the lower end of the elongated channel 86. In this way, the elongated channel 86 and the lower run track 92, together with the guide pan 90, form a circuitous guide rail, with the two guide rail subassemblies 84 guiding rollers of a forward conveyor subassembly in the manner hereinafter described.

For the purpose of guiding the endless chains forming a portion of the forward conveyor subassembly to be hereinafter described, a pair of chain guide tracks formed by downwardly projecting guide plates 104 are secured to each of the forward channel sections 100 by suitable brackets 106. An idler sprocket 107 can optionally be provided at the rear side of each of the chain guide tracks 102 to assure truer guidance of the chains of the forward conveyor, hereinafter described, as such chains undergo a crucial and important change in the direction of their travel during operation of the conveyor. There are also provided an idler sprocket 108 disposed at the forward and lower end of each conveyor support frame member 78, and a pair of drive sprockets 109 keyed to a drive shaft 111 extending between, and journaled in, the upper ends of the conveyor support frame members.

Projecting upwardly from the upper side of each of the elongated channels 86 are conveyor fence frames 110. Each fence frame 110 includes vertically projecting posts 112 having turned over, horizontally projecting upper ends 113 which support fence rails 114 which extend parallel to the elongated channels 86. Each of the conveyor fence frames 110 supports an elongated, polished fowl retention plate 116 which extends in a vertical plane from the upper end portion of the conveyor guide rail subassemblies and conveyor support frame members 78 to the lowermost and forward ends thereof. The nearest of the fowl retention plates 116 has been removed in the apparatus illustrated in FIG. 3 so that certain otherwise obscured structure can be observed. At the lower and forward ends of the fowl retention plates 116, each of these plates is bent or flared outwardly to form a mouth or entrance to the upwardly and rearwardly extending upper run of the conveyor (to be described). A pair of chain guard straps 120 project under the lower edges of the fowl retention plates 116, and extend horizontally for a short distance inside the respective fowl retention plate for covering the transverse outer edge of a conveyor apron, hereinafter described, and for preventing a gap from existing between this apron, the respective fowl retention plate and the exposed moving chain of the conveyor.

Figure 3:
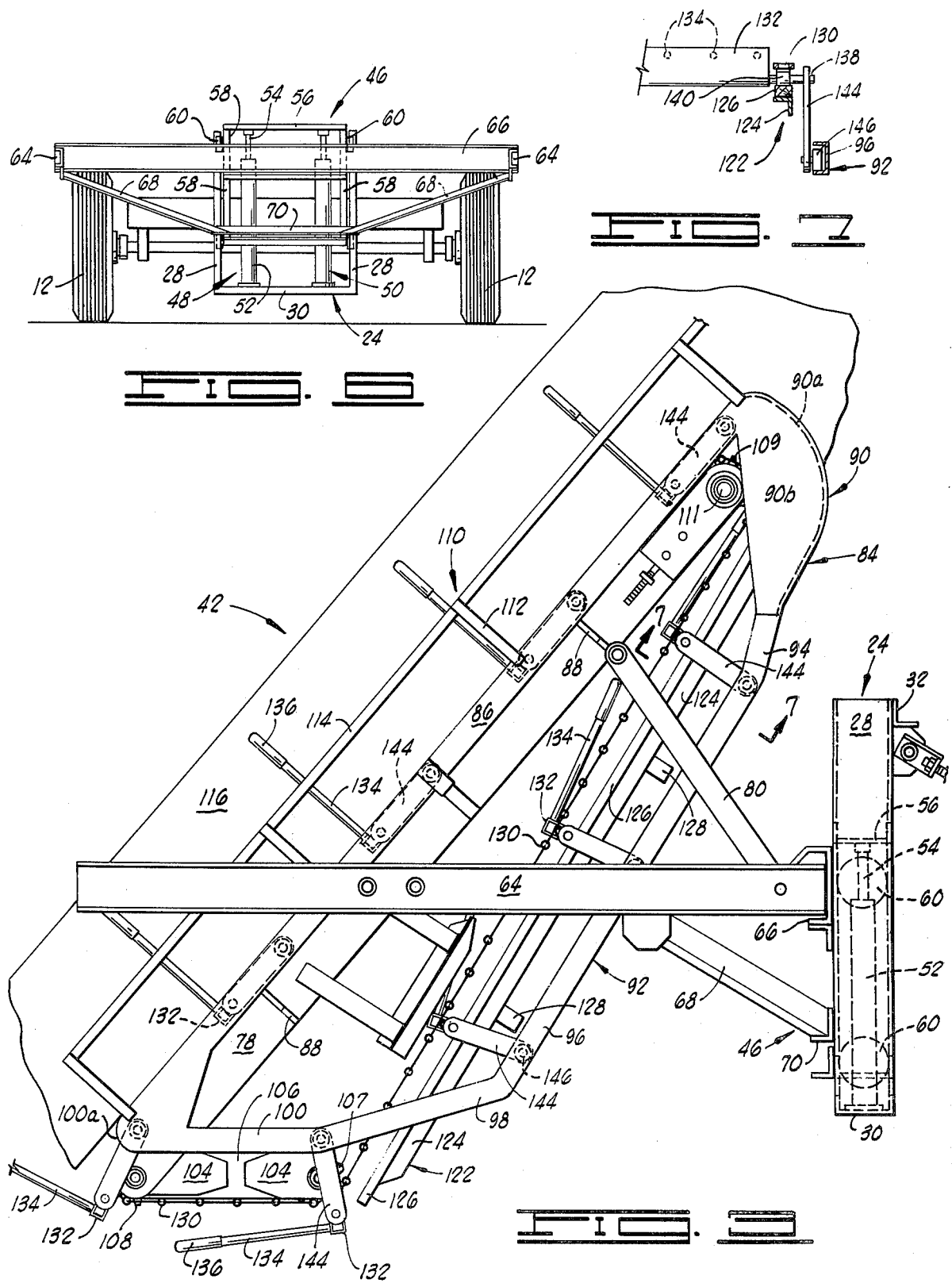
FIG. 3 is an enlarged side elevation view, with parts broken away, showing the forward pick-up and conveyor assembly used for picking up and elevating the chickens. A fowl retention plate normally present in the harvesting apparatus has been removed to facilitate observation of certain parts of the forward conveyor.
Figure 4:
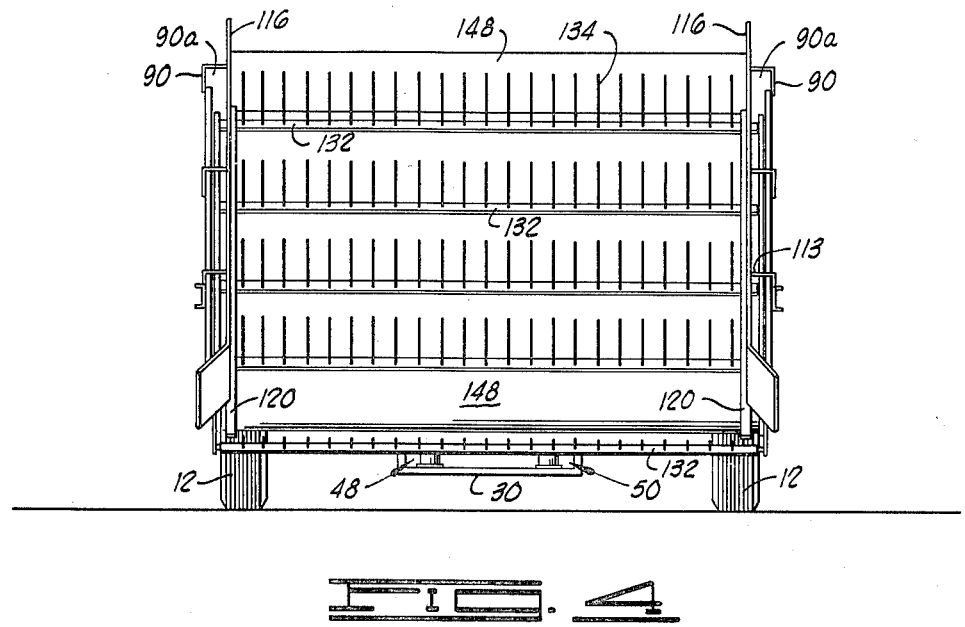
FIG. 4 is a front elevation view illustrating the forward pick-up and conveyor assembly as it appears when viewed from ahead of the fowl harvesting apparatus.
Figure 5:
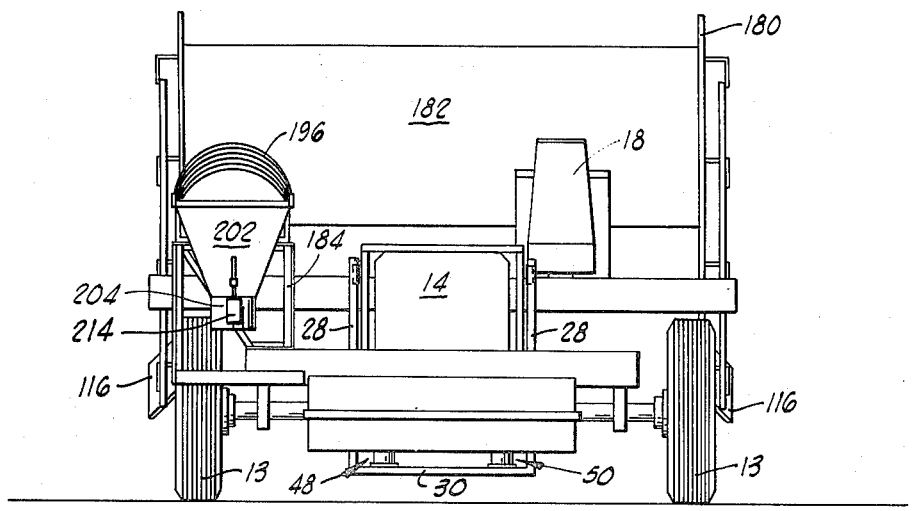
FIG. 5 is a rear elevation view showing the rear side of the fowl harvesting apparatus of the invention.

Extending downwardly and forwardly at opposite sides of the forward conveyor assembly 42 are a pair of slide rails 122 (see FIG. 3). In the illustrated embodiment, each slide rail 122 includes a metal base rail 124 and a wooden wear track 126 which is secured on the upper side of the metal base rail. Each slide rail 122 is positioned inwardly from the vertical plane containing the respective lower run track 92 on one side of the forward conveyor assembly 42 so that a lever arm forming a part of the conveyor can pass between the respective slide rail and lower run track in a manner and for a purpose hereinafter described. The horizontally spaced slide rails are rigidly interconnected through downwardly projecting brackets 128 and horizontally extending rods (not shown), which rods are supported on the forward conveyor assembly support frame 24 by means of forwardly projecting beams (not shown).

The conveyor subassembly which is included in the forward conveyor assembly 42 includes a pair of horizontally spaced endless chains 130 which engage, and are guided and driven by the idler sprockets 107 and 108 and the drive sprockets 109. Extending between the endless chains 130 are a plurality of spaced, elongated bars 132. The bars 132 are flat members extending transversely across the apparatus between the sprocket chains 130, and each having a plurality of elongated pick-up fingers 134 secured to the bar along one edge thereof and projecting normal to the flat side of the bar. Each of the pick-up fingers 134 has a relatively blunt free end which is preferably covered with a protective sleeve 136 which can suitably be made of rubber or other relatively soft, elastomeric material.

At the opposite ends of each of the bars 132, each bar has a pivot pin 138 projecting therefrom with the pivot pins being secured adjacent that side edge of the respective bar transversely opposite its side which carries the pick-up fingers 134. The pivot pins 138 secured to opposite ends of each bar 132 extend through journal loops or eyes 140 welded to one side of the respective sprocket chain 130, and are free to pivot in such eyes. This construction is illustrated in FIG. 7, where it will also be noted that the journal loops 140 project across and slidingly engage the exposed upper surfce of the wooden wear track 126 of each of the slide rails 122. At its outer end on the opposite side of the respective slide rail 122 from the respective sprocket chain 130- each pivot pin 138 is secured to one end of a pivot arm 1–4. At its opposite end from that which is secured to the pivot pin 138, each pivot arm 144 has journaled thereon, a tracking roller 146. The tracking roller 146 of the several pivot arms extend into the channels which make up the conveyor guide rail subassemblies 84, and these rollers track on the flanges of these channels during operation of the conveyor in the manner hereinafter described.

Secured to the upper sides of the conveyor support frame members 78 is a flat, transversely extending apron 148. The apron 148 is positioned below the elongated spaced bars 132 and the endless sprocket chains 130 during the operation of the conveyor, and provides a support for supporting chickens or other fowl being elevated on the conveyor.

For the purpose of driving the endless sprocket chains 130, a drive sprocket 150 is secured to the shaft 111 at one of its ends, and this drive sprocket is driven in rotation by a drive chain 152 extended around a sprocket 154 keyed to the power output shaft 156 of a hydraulic motor 158. The hydraulic motor 158 is connected by suitable hydraulic power fluid transmission conduits to the control levers 20 adjacent the operator's seat.

Figure 2:
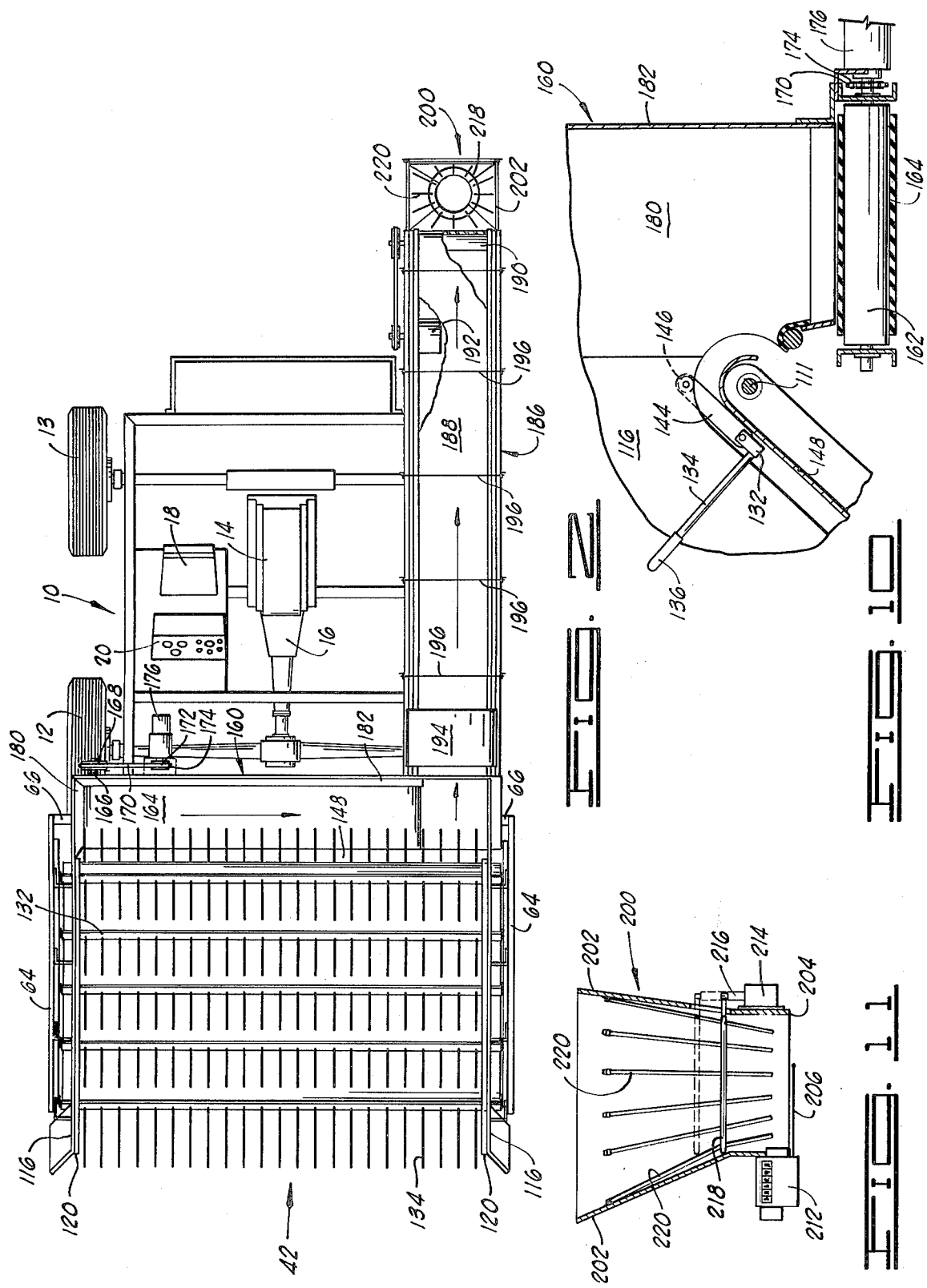
FIG. 2 is a plan view of the apparatus depicted in FIG. 1.

Mounted on the chasses 10 by suitable supporting members (not shown) at a location at the rear upper side of the forward conveyor assembly 42 is a cross conveyor assembly 160. The cross conveyor assembly 160 includes a pair of transversely spaced belt supporting rolls 162 which carry, and rotatably support, and endless conveyor belt 164 which is maintained under tension. One of the supporting rolls 162 is carried on a shaft 166 which projects rearwardly on the harvesting apparatus and has keyed thereto, a sprocket 168 which is driven by a chain 170 from a drive sprocket 172 carried on the power shaft 174 of a hydraulic motor 176, all as illustrated in FIGS. 2 and 8.

The cross conveyor assembly 160 further includes a housing which has a vertically extending end wall 180 which is secured to one of the fowl retention plates 116 to form a continuous wall therewith. A back wall 182 extends transversely across the harvesting machine in a vertical plane and is secured at one of its ends to the rear edge of the end wall 180. As will be hereinafter explained, the end wall 180 and back wall 182, in combination with the pick-up fingers 134, define an enclosure in which the fowl are deposited by the forward conveyor assembly 42 during operation of the harvesting apparatus.

Mounted on the main framework chassis 10 at one side thereof by means of suitable support posts 184 is a cooping conveyor assembly 186. The cooping conveyor assembly 186 includes an endless conveyor belt 188 which is extended around a pair of rollers 190, with one of the rollers being driven by a hydraulic motor 192. The forward end of the cooping conveyor assembly 186 extends under one end portion of the conveyor belt 164 of the cross conveyor assembly 160 in a position to receive fowl moved transversely across the harvesting apparatus by the cross conveyor assembly. Near its forward end, the cooping conveyor assembly 186 includes an arcuate plate 194 which extends upwardly and over the endless conveyor belt 188. Spaced along the length of the cooping conveyor assembly 186 are a plurality of arcuate wire bows 196 which, in cooperation with the arcuate plate 194, can be utilized to support a flexible cover (not shown) which may be a sheet of transparent plastic or a canvas cover or the like, where it is desired to use such cover to enclose the conveyor during the transport and conveyance of chickens or other fowl thereon in the manner hereinafter described.

Mounted on the rear end of the cooping conveyor assembly 186 on a suitable supporting frame is a hopper or chute assembly 200. The hopper or chute assembly 200 includes a chute or hopper of inverted frusto-pyramidal configuration, which chute or hopper is positioned to receive, at the large upper end thereof, chickens discharged from the rear end of the endless conveyor belt 188. Secured around the lower end of the chute or hopper 202 is a discharge tube 204 which can suitably be made of canvas or other strong fabric material. The upper edge of the chute or hopper 202 which is adjacent the rear end of the endless conveyor belt 188 is preferably secured to a suitable bar or rod (not shown) which can be pivoted about a horizontal axis to allow the chute and discharge tube attached thereto to be swung toward or away from the chassis 10 of the harvesting apparatus.

As best illustrated in FIGS. 1 and 11, the chute assembly 200 includes structure facilitating the counting of chickens passed through the hopper 202 and discharged through the flexible discharge tube 204. The apparatus also facilitates continuously monitoring the total weight of chickens placed in a coop positioned below the chute assembly 200, and facilitates the closure of the chute assembly so that no chickens pass through and are discharged therefrom after a predetermined total weight of chickens has been deposited in the coop below the chute assembly.

In referring to FIGS. 1 and 11, it will be noted that a sensing finger 206 is provided immediately beneath the discharge tube 204 and in the path of chickens gravitating through the chute assembly 200 to a coop 208 positioned below the discharge tube 204. The chickens thus contact the sensing finger 206 as they move from the chute assembly 200 into the coop 208. Positioned under, and supporting a plurality of coops is a portable scale 210 which continuously weighs the total weight thereon, including the one or more coops carried on the scale and the chickens in such coops.

To facilitate the automatic closure of the chute assembly 200 to prevent further loading of chickens, the sensing finger 206 is connected to a suitable pre-set counter 212 which can be pre-set to count out a specified number corresponding to the number of chickens passing the sensing finger 206. When this number of chickens has been registered by the counter, a signal is developed which is passed through suitable electrical circuitry to a solenoid 214 which, when energized, causes a projecting armature-piston 216 to extend in an upward direction. The solenoid 214 is mounted alongside the discharge tube 204 on a suitable rigid support, and has its armature-piston connected at its upper end to a constricting ring 218. Extending within the constricting ring, and circumferentially spaced therearound, are a plurality of closure fingers 220. Each of the closure fingers 220 is pivotally connected at its upper end to the inside wall of the hopper 202, with the points of connection of the several constricting fingers being outside the projected diameter of the constricting ring 218. Thus, when the constant diameter constricting ring 218 is moved upwardly by extension of the armature-piston of the solenoid 214, the effect is to bring the lower ends of the closure fingers 220 into convergence and prevent chickens from continuing to pass down through the chute assembly 200 to the coop 208 below.

In similar fashion, the portable scale 210 has its weight sensing platform mechanically connected to a pre-set controller 225 which develops an electrical signal at such time as the weight imposed on the scale 210 exceeds a pre-set value. The signal thus developed is also connected to the solenoid 214 and, when transmitted to the solenoid, functions to cause the extension of the armature-piston of the solenoid in an upward direction. This energization of the solenoid and extension of its armature-piston effects the upward movement of the constricting ring 218 and the convergence of the lower ends of the closure fingers 220 in the manner previously described.

Operation

The operation and utilization of the fowl harvesting apparatus of the invention can be considered as including two general modes of operation. First, in moving the apparatus from one location to another for the purpose of harvesting chickens or other fowl at different locations, the appartus is placed in an over-the-road or transport status. In this status of the apparatus, the forward conveyor assembly is elevated relative to the ground engaging wheels 12 and 13 of the apparatus so as to provide adequate clearance for movement over bumpy roads or uneven terrain. Elevation of the forward conveyor assembly 42 is accomplished by energization of the piston and cylinder assemblies 48 and 50 so that the extensible piston rods 54 thereof are extended, and in undergoing such extension, cause the movable supporting framework 46 to be moved upwardly on the forward conveyor assembly support frame 24. Elevation of the forward conveyor assembly 42 in the manner described moves it to the position illustrated in FIG. 1 of the drawings where there is adequate clearance to allow safe and relatively high speed over-the-road transport. With the forward conveyor assembly 42 in this position, the engine 14 can be drivingly engaged with the wheels 12 to facilitate automotive movement of the harvesting apparatus. The wheels 13 are preferably made steerable and the operator's seat 18 susceptible to swiveling through 180° so that the harvesting apparatus, when moved in the manner described, can progress in a direction which is generally toward the right as the apparatus is viewed in FIG. 1.

The second operational status of the harvesting apparatus of the invention is the harvesting status in which the harvesting of fowl is carried out utilizing the several conveyor assemblies included in the apparatus. In preparing to use the apparatus for harvesting fowl, the forward conveyor assembly 42 is first lowered from its transport position as illustrated in FIG. 1 to a position in which the pick-up fingers 134 will pass in immediate juxtaposition to the ground at the location where they traverse the lowermost portion of their circuitous travel as hereinafter explained. In this arrangement, the pick-up fingers 134 are very slightly downwardly inclined from their ends secured to the bars 132 to their free ends.

The hydraulic motor 158 is then energized to drive the drive sprocket 150, causing the endless chains 130 to be synchronously driven through the circuitous path hereinafter described. As the endless chains 130 undergo movement, the elongated bars 132 are moved therewith, as are the pick-up fingers 134 attached to these bars, the pivot pins 138 secured to opposite ends of each bar and the pivot arms 144 secured to the pivot pins. It will be noted in referring to FIGS. 3 and 8, that during that portion of the travel of the endless chains where portions of the chains are moving up the incline over the apron 148 at the upper side of the forward conveyor assembly 42, the pivot arms 144 each extend parallel to, and are in alignment with, the elongated channels 86. During this time, the pivot arms 144 are retained in this position by the tracking of the tracking rollers 146, carried on the free ends of the pivot arms, in the channels 86. Retention of the pivot arms 144 in this position retains each of the elongated bars 132 in a position such that pick-up fingers 134 secured to one side thereof project substantially normal to the apron 148 and thus collectively provide a plurality of spaced fences extending transversely across the apron and formed by aligned rows of the pick-up fingers.

At the upper end of the forward conveyor assembly 42, the tracking rollers 146 secured to the ends of the pivot arms 144 encounter the roller guide flange 90a of the half moon shaped guide pan 90. The pivot arms 144 are thus, at this time, caused to undergo a downward pivotal movement which, as a result of their connection through the pivot pins 148 with the elongated bars 132, causes these bars to undergo pivotation in a way which causes the pick-up fingers 136 to turn in a rearward direction through an angle of about 120° as illustrated in FIG. 9. It should be noted at this point, that the position and orientation of the elongated bars 132 at any time is a function of the position of the points on the endless chains 130 to which a particular elongated bar is attached, and the position of the pivot arms 144 connected through the pivot pins 138 to opposite ends of the respective bars.

As the tracking rollers 146 track upon the roller guide flange 90a of the guide pan 90, the endless chains 130 move over the sprockets 109. The chain path on the lower side of the forward conveyor assembly is determined by the extension of the chain between the sprockets 109 and 107, and between the sprockets 107 and 108. The path followed by the tracking rollers 146, on the other hand, is determined by the configuration of the lower run track 92 made up of the channel sections 94 – 100 in the manner hereinbefore described. Thus, after each tracking roller 146 leaves the roller guide flange 90a, it tracks in the channel section 94 and then in the channel section 96. This results in the respective pivot arms 144 being moved into the downwardly extending positions shown in FIG. 3. In this position, the elongated bars 132, attached to such downwardly extending pivot arms 144 through the intervening pivot pins 138, are oriented so that the pick-up fingers 134 project virtually parallel to the direction of extension of the endless chains 130. At this time, the journal eyes 140 through which the pivot pins are extended slide upon the upper side of the wooden wear track 126 secured to the base rail 124 as shown in FIG. 7.

Due to a slight convergence of the path of the endless chains 130 and the slide rails 122 with the channel section 96, the movement of the elongated bars 132 secured between the chains downwardly toward the lower end of the channel section 96 results in a slight pivotation of the bars 132 so that the pick-up fingers 134 carried on bars approaching this point in their path of travel are raised slightly upwardly out of the plane of the two endless chains 130 as illustrated in FIG. 3. As the tracking rollers 146 move into the channel section 98, the described pivotal movement of the respective bars 132 connected thereto is accentuated as the plane in which the two transversely spaced channel sections 98 are located intersects and crosses the plane of the two endless chains 130. The result of this relative orientation of the channel sections 98 and the endless chains 130 is to cause pivotation of the bars 132 and pick-up fingers 134 through an angle of nearly 180° (the bars, in effect, "flip over").

Thus, as the tracking rollers 146 enter the part of the path or track constituted by the forwardmost channel sections 100, the pivot arms 144 extend downwardly as shown in FIGS. 3 and 8, and the pick-up fingers 134 are in juxtaposition to the ground. It will be noted that the free outer ends of the pick-up fingers 134 which carry the protective sleeves 136 very nearly touch or scrape the ground at this time, and that the collective array of the fingers 134 on each of the elongated bars 132 effectively forms a fence or barrier preventing fowl from squeezing or running beneath the forward, lower end of the forward conveyor assembly 42. The pick-up fingers 134 and bars 132 to which they are connected are maintained in this position during the continued traverse of the channel sections 100 by the tracking rollers 146 since these channel sections extend substantially parallel to that span of the endless chains 130 extending between the sprockets 107 and 108.

At the forward and lowermost portion of the forward conveyor assembly 42, the tracking rollers 146 track against the radiused end portions 100a of the forwardmost channel sections 100, and the chains 130 pass around the sprockets 108. This movement causes a pivotation of the pivot arms 144 and a concurrent elevation of the pick-up fingers 34 so that the pick-up fingers are brought into the position in which they ascend the forward conveyor assembly and extend substantially normal to the apron 148. It will here be noted that at the forwardmost point of their travel, the pick-up fingers 134 project forwardly ahead of the entire harvesting apparatus immediately prior to being brought into their ascending position in which they extend normal to the apron 148.

When the harvesting apparatus is in use for harvesting chickens from the floor of a broiler house or other location at substantially ground level, the apparatus is driven in the direction of the forward conveyor assembly 42, i.e., toward the left as the apparatus is viewed in FIG. 1. As the harvesting apparatus is moved in this direction, the hydraulic motor 158 is energized to drive the endless chains 130. The movement of the endless chains causes the pick-up fingers 134 secured to the several bars 132 to undergo the movements hereinbefore described in detail. Thus, there is always provided at the forward lower side of the forward conveyor assembly 42, a row or set of the pick-up fingers 134 which extend downwardly into close proximity to the ground, and form a barrier or fence preventing the chickens from running under the forward end of the conveyor assembly. There is also provided, periodically, a set of the pick-up fingers in one row which projects from the foremost end of the forward conveyor assembly 42 and, due to the movement of the harvesting apparatus simultaneously with the movement of the endless chains, causes these foremost pick-up fingers to be extended between the legs and under the bodies of the chickens.

Almost immediately after this row of pick-up fingers 134 attains this position, the fingers in this row commence to pivot upwardly, lifting the chickens and commencing to move them upwardly and rearwardly on the forward conveyor assembly 42. The chickens tend to slide down the upturned row of pick-up fingers 134 and almost immediately come into contact with the apron 148. As the rows of pick-up fingers 134 move upwardly on the apron 148, they form therewith an angle in which the chickens being elevated on the forward conveyor assembly are positioned, and the close proximity of the bars 132 to the apron 148 (they are in sliding contact with each other) prevents the toes of the chickens from becoming wedged or caught between the bars and the apron. The chickens are also protected from the moving endless chains 130 by the chain guard straps 120, and are prevented from moving off of the apron to either side of the moving conveyor by the fowl retention plates 116.

At the upper end of its travel, the conveyor which includes the rows or fences formed by the pick-up fingers 134 is reversed in its direction of movement, and the pivotal movement of the pivot arms 144 hereinbefore described occurs. This results in the pick-up fingers 134 carried on each bar 132 undergoing the reversing movement, first being pivoted to a substantially horizontal position, and then back into the position in which the pick-up fingers extend in a plane which is substantially coincident with the plane of the endless chains 130. As these pick-up fingers 134 undergo this movement and the bars 132 upon which they are mounted are pivoted, the chickens are discharged from the forward conveyor assembly 42 onto the conveyor belt 164 of the cross conveyor assembly 160.

From the cross conveyor assembly 160, the chickens are discharged and gravitate onto the endless conveyor belt 188 of the cooping conveyor assembly 186. The cooping conveyor assembly 186 then moves the birds rearwardly on the harvesting apparatus until they are discharged into the hopper assembly 200. The hopper 202, in conjunction with the discharge tube 204 provided thereon, can then be utilized to directly discharge the chickens or other fowl into appropriate coops or containers, or the chickens may, instead, here be received by personnel who can then carry them to other locations for disposition.

In the usual mode of operation, the chickens or other fowl are discharged to coops through the hopper 202 and discharge tube 204, and automatic control of the number of chickens thus discharged, or of the weight of chickens discharged to each coop, is provided by the mechanism and electrical circuitry illustrated in FIGS. 1 and 11. Thus, if it is desired to place a given number of chickens in one coop, this number can be set on the pre-set counter 212 so that, after this number of chickens has passed through the discharge tube 204 and contacted the sensing finger 206, the electrical signal developed by the counter 212 will actuate the solenoid 214 to cause upward movement of the constricting ring 218. This will cause the lower ends of the closure fingers 220 to converge by an amount sufficient to prevent further passage of chickens therethrough, and there is sufficient flexibility in these fingers that a chicken, whose downward movement may be arrested by this closing or converging action of the fingers, is not harmed in any way, but is simply temporarily arrested in the hopper assembly 200 until discharge of chickens is resumed.

In similar fashion, where it is desired to place a certain weight of chickens in each of the coops 208, a pre-set total weight can be set on the controller 225 so that a signal is developed by the controller when this total weight is reached. This weight will, of course, be the total weight of chickens which it is desired to place in the uppermost coop, in addition to the weight of the coops themselves. When the signal functions to actuate the solenoid 214, the same sequence then occurs resulting in the convergence of the lower ends of the closure fingers 220, and the arresting of any further downward movement or discharge of chickens.

It may be here pointed out that in the case of chickens, these fowl have been found to usually remain relatively stationary or quiescent when they are standing upon a moving surface, such as that constituted by the conveyor belts used in the several conveyor assemblies of the harvesting apparatus. It is therefore not generally necessary to provide total confinement to the chickens to prevent them from flying from their position on the conveyor belts. For the purpose of providing such confinement where other fowl are being harvested, however, the arcuate plate 194 and arcuate wire bows 196 are provided so that a plastic sheet or fabric cover can be provided over the cooping conveyor belt 188 to thus confine the chickens, and appropriate top or cover plates can also be placed across the end wall 180 and back wall 182 of the cross conveyor assembly 160, as well as across the fowl retention plates 116 of the forward conveyor assembly 42.

Although a preferred embodiment of the present invention has been herein described, it will be understood that various changes of structure, and in the various assemblies and subcombinations herein described, can be effected without departure from the basic principles of the invention. Changes and innovations of this type, however, in their continuing reliance upon such basic principles, are considered to be within the spirit and scope of the present invention except as the same may be necessarily limited by the appended claims or reasonable equivalents thereof.

What is claimed is:

1. A method of harvesting fowl comprising:
   moving a plurality of substantially horizontally extending lifting fingers through an endless path, a portion of which is adjacent a surface upon which the fowl are standing, to project and extend said fingers beneath the fowl;
   raising and pivoting the fingers immediately after their extension beneath the fowl to lift the fowl and support them on the fingers and a cooperating supporting structure; and
   transferring the fowl from the lifting fingers to a substantially horizontally extending conveying surface to convey the fowl to a cooping location, said movement of the fingers being carried out at one point during the movement thereof through said endless path to concurrently move all of the fingers in a common direction toward the fowl.

2. The method defined in claim 1 and further characterized as including the step of providing a barrier adjacent the location from which the fowl are to be lifted to prevent the fowl from running in one direction away from the lifting location.

3. Apparatus for harvesting domestic fowl comprising:
   means for first forming a barrier to prevent the fowl from running in one direction along the ground, and then for lifting and moving the fowl to a cooping location, said barrier forming and lifting means comprising:
   a plurality of spaced, substantially parallel elongated bars;
   means for moving said bars through a circuitous path having a portion adjacent the ground, and concurrently pivoting the bars about their longitudinal axes at times during the traversal of said circuitous path; and
   projecting means extending substantially normal to each of said bars and projecting between the respective bar and the ground as each respective bar passes through the portion of said circuitous path adjacent the ground;
   a framework having said barrier forming and lifting means mounted thereon;
   a chassis having ground engaging wheels thereon;
   a frame on said chassis movably supporting said framework; and
   means for hydraulically elevating and lowering said framework on said frame.

4. Apparatus as defined in claim 3 wherein said means for moving said bars comprises:
   a pair of spaced, endless chains connected to, and supporting, the opposite ends of said bars;
   pivot arms connected to said bars; and
   channel means cooperating with a portion of said pivot arms to move said arms and pivot said bars as said bars are moved by said endless chains.

5. Apparatus as defined in claim 4 wherein barrier forming and lifting means further comprises:
   a cross conveyor for receiving fowl from said projecting means; and
   a cooping conveyor for receiving fowl from said cross conveyor.

6. Apparatus for harvesting domestic fowl comprising:
   means for first forming a barrier to prevent the fowl from running in one direction along the ground, and then for lifting and moving the fowl to a cooping location;
   means adjacent said barrier forming and lifting means for confining the fowl laterally during the lifting of the fowl;
   a framework having said barrier forming and lifting means movably mounted thereon, and having said confining means mounted thereon for movement concurrently with the barrier forming and lifting means as said framework is moved;
   a chassis having ground engaging wheels thereon;
   a frame on said chassis movably supporting said framework; and
   means for elevating and lowering said framework on said frame.

7. Apparatus for harvesting domestic fowl comprising:
   a plurality of fingers arrayed in spaced rows;
   means for moving the fingers through an endless path having a lowermost portion and a forward portion;
   means for guiding and supporting the fingers during their movement through said endless path, and for positioning each row of said fingers in a generally horizontally extending position during traversal of the lowermost portion of the path;
   means cooperating with the fingers to form a forward conveyor;
   a framework supporting the conveyor, the finger moving means, and the finger guiding and supporting means to position the ends of the fingers in each row adjacent the ground when the fingers traverse the lowermost portion of the endless path; and
   a mobile structure having the framework mounted thereon to facilitate transport of the apparatus from one location to another.

8. The apparatus defined in claim 7 wherein said means for moving the fingers comprises:
   a plurality of spaced endless chains;

sprockets drivingly engaging said chains; and a motor connected to at least one of said sprockets for driving said one sprocket.

9. The apparatus defined in claim 7 wherein said means for guiding and supporting said fingers comprises:

a plurality of interconnected channels collectively forming a first guide rail subassembly;

a plurality of interconnected channels collectively forming a second guide rail subassembly which is spaced horizontally from said first guide rail subassembly on the opposite side of said rows of fingers from said first guide rail subassembly;

a bar rigidly connected to the fingers in each row of fingers; and pivot arm means interconnecting each end of each of said bars with one of said guide rail subassemblies.

10. Apparatus as defined in claim 9 wherein said means for guiding and supporting said fingers is further characterized in including a pair of horizontally spaced slide rails positioned on opposite sides of the rows of fingers and each having a plurality of said pivot arm means slidingly bearing thereagainst during the movement of each of the rows of fingers through a portion of said endless path.

11. Apparatus as defined in claim 9 wherein each of said pivot arm means comprises:

a pivot pin secured to one end of one of said bars;

a pivot arm having one end connected to said pivot pin; and a roller connected to the other end of said pivot arm and rollingly engaging one of said guide rail subassemblies.

12. Apparatus as defined in claim 7 wherein said means cooperating with the fingers to form a forward conveyor comprises a vertically extending, inclined apron extending under the rows of fingers during ascension of such rows from the forward portion of said path to the uppermost portion of said path.

13. Apparatus as defined in claim 7 wherein said mobile structure comprises:

a chassis; and a frame mounted on said chassis and having said framework movably mounted on said frame for vertical reciprocation.

14. Apparatus as defined in claim 7 and further characterized as including:

a cross conveyor mounted on said mobile structure in a position to receive fowl from said forward conveyor; and a cooping conveyor for transferring fowl from said cross conveyor to a cooping location.

15. Apparatus as defined in claim 14 and further characterized as including:

a hopper connected to said cooping conveyor and adapted to pass fowl from the cooping conveyor to a coop;

scale means positioned beneath the hopper for supporting a coop below the hopper for receiving fowl therefrom;

control means for developing a control signal when a predetermined weight is placed on said scale; and solenoid means mounted on said hopper and connected to said control means for preventing fowl from passing through the hopper from the cooping conveyor in response to a signal received from said control means.

16. Apparatus as defined in claim 14 and further characterized as including:

sensing means for sensing each fowl discharged from one end of said cooping conveyor;

a control signal developing counter connected to said sensing means for counting the number of fowl discharged from the cooping conveyor, and developing a control signal after a predetermined number of fowl have been so discharged; and solenoid means connected to said counter for receiving the developed control signal therefrom and arresting the movement of fowl from said cooping conveyor.

17. Apparatus as defined in claim 16 and further characterized as including a hopper connected to said cooping conveyor and adapted to pass fowl from the cooping conveyor to a coop, said hopper having said solenoid means mounted thereon for arresting the movement of fowl through the hopper.

18. Apparatus as defined in claim 17 and further characterized as including automatic weighing means connected to said solenoid means and positioned below said hopper for weighing fowl passed from the cooping conveyor to a coop, and automatically actuating said solenoid means to arrest the movement of fowl through the hopper when a predetermined weight of fowl has been deposited in the coop.

19. Apparatus as defined in claim 16 wherein said solenoid means comprises:

an electrical solenoid including a reciprocating armature-plunger;

a plurality of spaced ribs arrayed to lie in the frustum of a cone, and each having an end at the large end of the cone pivotally secured to the inner wall of the hopper with the array of ribs converging toward each other from said point of pivotal securement;

a rigid ring of fixed diameter positioned around said spaced ribs intermediate the length thereof and connected to said electrical solenoid armature-plunger for shifting the ring toward and away from the points of pivotal securement of said ribs to said hopper when said solenoid is actuated.

20. Apparatus for harvesting fowl comprising:

a chassis;

ground engaging wheels on the chassis;

a vertically extending frame mounted on the chassis at one side thereof;

a framework movably mounted on said frame;

means for elevating and lowering said framework on said frame;

inclined first conveyor means mounted on said framework and including:

a plurality of endless chains;

means for driving the chains through parallel inclined circuitous paths;

a plurality of spaced, substantially parallel, elongated bars extending between, and secured to, said endless chains;

a plurality of fingers carried on, and projecting in the same direction from, each of said bars to form a row of fingers on each bar;

means for pivoting said bars and guiding said chains during the movement of said chains in response to said driving means to position the fingers in each row in a generally horizontally extending position during traversal of the lowermost portion of the path of said chains; and an inclined apron extending under said elongated bars along the length of said chains and forming a supporting surface for fowl moved upwardly on said first conveyor means by the movement of said bars and the fingers carried thereon;

second conveyor means positioned to receive fowl from said first conveyor means;

a frusto-conical hopper positioned at the end of said second conveyor means for receiving fowl discharged from the end of said second conveyor means;

means connected to said hopper for counting and weighing fowl discharged from said second conveyor means through said hopper, and for interrupting and obstructing movement of fowl through said hopper after a predetermined number of fowl or, alternately, a predetermined weight of fowl, has passed through said hopper.

* * * * *